Inventors:
Yale Karmell and
Kermit K. Geiger.
By: Horton, Davis, Brewer & Brugman
Attys.

3,519,508
METHOD OF MAKING A RUBBER COVERED STEEL MILL ROLLER
Yale Karmell, Chicago, and Kermit K. Geiger, Carpentersville, Ill., assignors to Samuel Bingham Company, Franklin Park, Ill., a corporation of Illinois
Original application Dec. 7, 1966, Ser. No. 599,825, now Patent No. 3,451,112, dated June 24, 1969. Divided and this application Jan. 9, 1969, Ser. No. 800,321
Int. Cl. B31c 1/08
U.S. Cl. 156—171                        4 Claims

ABSTRACT OF THE DISCLOSURE

A method of making a rubber covered steel mill roller comprising winding resin soaked fibers about a metal core, separately forming a rubber sleeve and then placing the rubber sleeve over said fiber wound metal core.

---

This application is a division of application Ser. No. 599,825, filed Dec. 7, 1966, now Pat. No. 3,451,112.

This invention relates in general to rollers, and more particularly to rubber covered steel mill rollers.

Difficulties have been common with these types of rollers, which are used in sheet pickling solutions, tin plating, and the like, because the steel sheet frequently cuts through the rubber cover to expose the steel core of the roll to the acid solution or bath employed, resulting in unobservable serious erosion and weakening of the core.

A principal object of this invention, therefore, is to avoid such difficulties with steel mill rolls, and this is accomplished by interposing a hard, acid resistant, protective coating for the steel core between the latter and the rubber cover. In the present embodiment, reinforced plastic, preferably fibrous glass reinforced polyester resin, is used as the protective coating, which is hard, almost rigid, has extremely good resistance to mineral acids, and does not propagate cut or crack growth.

Another object of the invention is to minimize the cost and time required to make such rolls and, at the same time, to make possible and facilitate recovering of a roller or replacement of a badly worn or cut rubber cover thereon. This object is attained by providing a novel construction and method of manufacture which includes preforming of a fibrous glass reinforced resin lined rubber sleeve or tube for the roller cover and applying the same to, or mounting it upon, a steel core having a finished protective layer of reinforced plastic thereon.

Numerous other objects and advantages of the invention will be apparent as it is better understood from the following description, which, when taken in connection with the accompanying drawings, discloses a preferred embodiment thereof.

Figure 1:
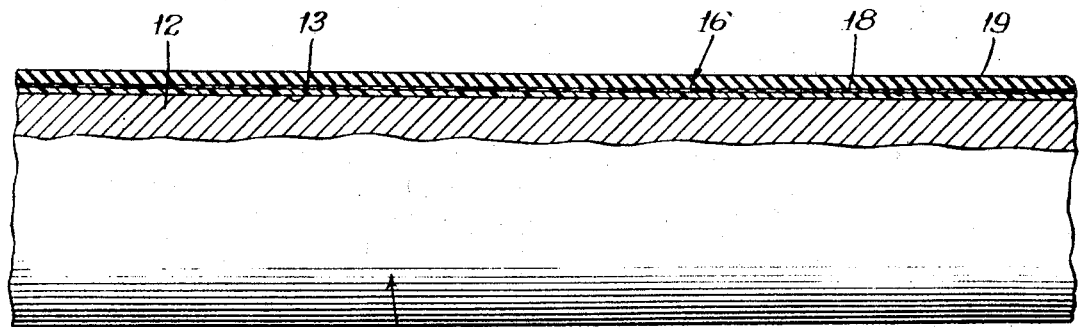
FIG. 1 is an elevational view of a roller embodying the features of the invention, partly broken away and partly in vertcial section.
Figure 3:
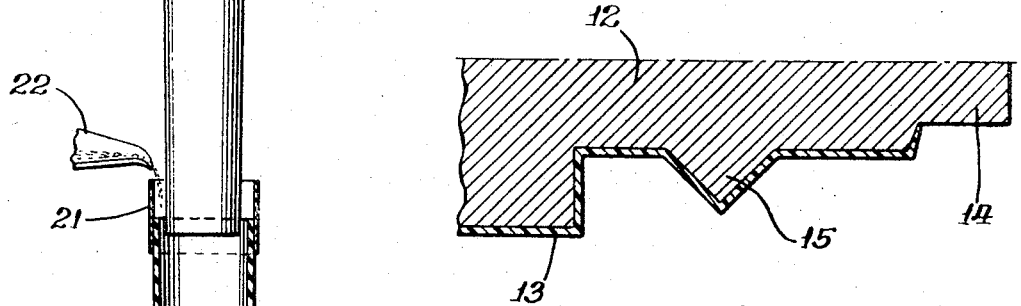
FIG. 3 is a vertical section of half of an end portion of the core of a roller like that of FIG. 1 on substantially the same scale as the latter.

Referring more particularly to FIG. 1, reference numeral 11 indicates in general a steel mill roller comprising the usual metal core 12 and a protective layer of reinforced plastic 13 mounted thereon and covering the whole of the core, except for the end bearing portions or spindles illustrated at 14 in FIG. 3. As shown in the latter figure, this protective plastic layer 13 also covers, or is formed on, any throw or acid ring or rings 15 which may be employed or constitute a part of the core 12.

The protective layer of reinforced plastic 13 preferably is made up of fibrous glass reinforced polyester resin or fibrous glass reinforced phenolic resin to a thickness of ¼ to ⅜ of an inch. This protective layer is applied to the core 12 by rotating the latter in a lathe and winding resin soaked fibrous glass rovings or woven tapes or fabrics thereon to the desired thickness, it being understood that other suitable fibrous materials in addition to glass, such as nylon, asbestos or mineral wool and other acid resistant resins, such as melamine, may be used. To avoid deterioration due to subsequent exposure to acids at elevated temperatures, it is preferred that a resin based on bisphenol A, such as that known in the trade as "Atlac 383–05A" be employed. This application of the protective layer 13 to the metal core 12 is accomplished at room temperature, and the resin gels as it is applied to the core.

As soon as the protective cover has been so applied to the core, preferably with a slight degree of over-building, and has set, the outer surface thereof is ground in well-known manner to the desired diameter and with a longitudinally extending taper of approximately .002 of an inch per inch of length to facilitate subsequent assembly of a rubber cover 16 thereon. The resulting protective layer 13 of reinforced plastic is hard, rigid, with extremely good resistance to mineral acids, and does not propagate cut or crack growth. Therefore, it will resist cutting through to the metal of the core 12 by the sheet metal with which it subsequently cooperates, and minor damage to this protective covering 13 may readily be repaired.

Figure 2:
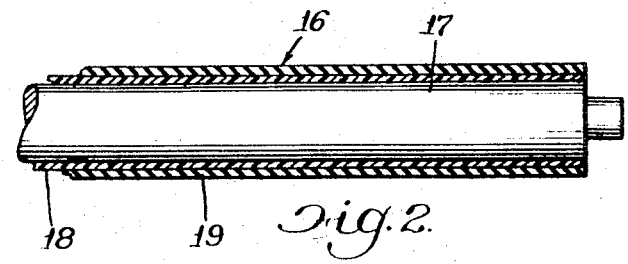
FIG. 2 is a vertical section through one end of a mandrel with a cover for the roller formed thereon, and on a smaller scale than FIG. 1.

The rubber cover 16 is preformed as a sleeve or tube on a mandrel 17 (FIG. 2) having the same longitudinal taper as that given the finished protective layer 13 on the core 12. To this, end, the same fibrous glass reinforced plastic used to cover the core in the form of resin soaked fibrous glass rovings or woven tapes or fabrics is wound on the mandrel in a lathe to the desired thickness of from ¹⁄₁₆ to ⅛ of an inch. As previously noted, the resin gels as it is applied to the mandrel, and when the proper amount has thus been applied to provide a reinforced plastic lining 18, it is covered with a thin coat of a suitable cement, such as that known in the trade as

"3M–EC–1838"

and calendered elastomer is then built thereon in well-known manner to the desired thickness for finishing the roller and providing a rubber sleeve 19. Rubber or synthetic rubber conventionally compounded normally is used and is built up sufficiently to provide for the standard finished rubber thickness of ¾ of an inch, or from ½ of an inch to 1 inch. Webbing then is applied or wound around the rubber covered mandrel and the rubber is vulcanized in well-known manner. After vulcanizing, the webbing is removed, and the exterior surface of the rubber sleeve 19 is ground and the ends thereof trimmed while still on the mandrel. Thus, when subsequently removed from the mandrel, a preformed rubber cover 16 (FIG. 4) comprising the outer finished layer of rubber 19 and an inner lining 18 of reinforced plastic (FIG. 2) is available for mounting on the core 12 with its protective cover 13 to complete the roller 11.

Figure 4:
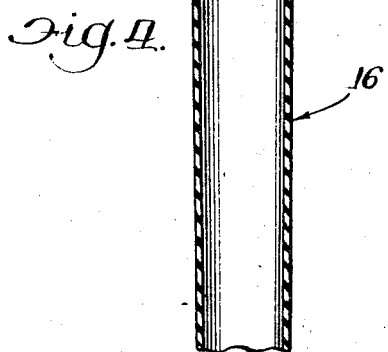
FIG. 4 is an elevational view on a similar scale to that of FIG. 2 illustrating the method of mounting the cover on the core, with the cover and a reservoir-forming collar on the upper end thereof shown in section.

This mounting of the preformed rubber cover 16 is accomplished in the manner illustrated in FIG. 4, the cover being positioned vertically in any suitable manner with its end having the larger interior diameter upward and the core being suspended above the cover in any suitable manner and also with its larger end uppermost. A guard or reservoir-forming collar 21 is temporarily mounted on the upper end of the cover 16, the smaller lower end of the cover 12, 13 is lowered into the upper end of the cover 16 to a position of approximately that illustrated in FIG. 4, and the cup-like space thus provided between the collar 21 and the lower end of the core is filled with a quantity of the same resin employed in building up the protective layer 13 of the core and the plastic lining 18 of the cover through the agency of any suitable supply mechanism, such as the spout 22 illustrated in FIG. 4. The core 12, 13 is slowly lowered into the preformed covering sleeve 16, with resin continuing to be added by means of the spout 22 to keep the annular space defined by the core and the collar 21 supplied therewith at all times to exclude air from the bond thus to be effected between the core and the tube. The resin hardens in a few minutes and the roller can be finished within an hour after such assembly. Finishing is accomplished by placing the assembled roller 11 in a lathe and trimming off the end portions thereof and any excess resin or plastic that may be adhered thereto. A light coating of any suitable wax-containing resin is then applied to all exposed portions of the reinforced resin. If a roller having end configurations similar to that illustrated in FIG. 3 is involved, the area to which such wax-containing resin is applied would include the plastic covered circumferential surface of the acid throw rings 15 and adjacent portions of the core 12.

It will be appreciated that the invention contemplates recovering of such rollers 11 which have sustained substantial damage to the rubber cover 16. This may be accomplished in the least expensive manner possible by mounting the roller 11 in a lathe and stripping or tooling the damaged cover 16 therefrom to reduce the roller to approximately its original size with the protective layer 13 thereon, and then grinding the thus exposed outer surface of the protective cover 13 to the desired diameter and with the longitudinally extending taper originally given the same. A new preformed cover 16 thereafter may be applied to such refinished core 12, 13 in the same manner as the original cover 16 was mounted thereon.

It has been found by testing under standard operating conditions that a steel mill roller constructed in accordance with this disclosure functions completely satisfactorily to prevent damage to the metal core even where serious cutting of the rubber cover has been effected during its use. In such tests, a V-shaped groove was cut in the roller through the rubber 19 and reinforced plastic lining 18 of the cover 16 and into, but not through, the protective layer of reinforced plastic 13 at an angle of 45° to the axis of the roller to simulate cutting of the roll in use. The test roller then was run with a pressure of 6 pounds per lineal inch at a speed of 205 feet per minute which was later in the run increased to 400 feet per minute. This test run was accomplished in an acid bath of 5 percent by volume each of nitric, sulphuric and hydrofluoric acids and 15 percent by volume of hydrochloric acid at a temperature of 140° F. for fifty hours. With the same setup, the bath was replaced with one comprised of 15 percent by volume of sulphuric acid and the temperature increased to 200° F., the run being continued at the same speeds for another twenty-four hours, after which it was determined by removal of the cover and the protective layer that the metal core was unaffected. The glass reinforced plastic not only is sufficiently hard and rigid to deflect edge portions of steel sheeting with which such rollers are used, but its resistance to acids and propagation or growth of any cuts or cracks therein effectively protects the metal core against attack by the acids. The method herein disclosed of manufacturing and recovering such rollers minimizes the cost thereof while substantially reducing the time required for recovering. During use, there can be no turning or slippage of the rubber cover 16 relative to the core 12, 13 due to the excellent character of the bond between the rubber and the plastic which is enhanced when it is formed before any of the components are completely reacted. Of course, this condition also facilitates stripping of the cover during refinishing of a roller and subsequent finish grinding of the protective layer 13 to its originally machined dimensions.

In some cases where the resistance torque applied to a roller in use is light, as in tin plating, it will be found to be practical to mount the fibrous glass reinforced resin lined rubber cover 16 directly on the metal core 12, the cover then being held on the core by end clamps, or the like. In this manner, the rubber cover 16 comprising the rubber sleeve 19 with its reinforced plastic lining 18 finds a practical use apart from a core having a previously formed protective coating of fibrous glass reinforced plastic.

From the foregoing, it is believed that those familiar with the art will readily recognize and appreciate the unique features and advantages of the present invention over previously known devices of this character. Further, it will be understood that while the present invention has been disclosed in association with particular and preferred embodiments thereof as set forth in the accompanying drawings and above described, the same nevertheless is susceptible to change, variation and substitution of equivalents without departure from the spirit and scope of this invention. It is therefore intended that the present invention be unrestricted by the foregoing description and illustrations, except as may appear in the following appended claims.

We claim:

1. The method of making a steel mill roller, comprising winding resin soaked fibrous glass rovings on a metal core to form a protective layer, tooling the peripheral surface of said protective layer; separately forming a rubber cover by winding resin soaked fibrous glass rovings on a mandrel to form a lining, covering same with a coating of cement, winding calendered rubber thereon to form an outer-sleeve, covering said sleeve with webbing, vulcanizing said rubber, removing said webbing and finishing said rubber sleeve by surface grinding and trimming the same, and removing said finished rubber cover from the mandrel; and assembling said rubber cover over said protective layer on said metal core.

2. The method of claim 1, wherein said tooling of the peripheral surface of said protective layer produces a slight longitudinal taper, and said mandrel is similarly tapered to complementally taper the inner surface of said lining.

3. The method of claim 2, wherein said assembling comprises positioning said preformed rubber cover vertically with its larger interior diameter uppermost, placing a reservoir-forming collar on the upper end of said cover, suspending said core above said cover in axial alignment therewith and with its larger end uppermost, and lowering said core into said cover while supplying resin to the space defined by said collar and said core to exclude air from the bond to be effected thereby between the cover and the core.

4. The method of claim 1 in which the step of assembling said rubber cover of said protective layer on said metal core comprises positioning said rubber cover with its longitudinal axis extending vertically, placing a reservoir-forming collar on the upper end of said rubber cover, suspending said core vertically in axial alignment with said rubber cover, and lowering said core into said rubber cover while supplying resin to the space defined by said collar and said core to exclude air from the bond to be effected thereby between the rubber cover and the core.

References Cited

UNITED STATES PATENTS

| | | | |
|---|---|---|---|
| 1,871,953 | 8/1932 | Chilton | 156—172 |
| 2,106,850 | 2/1938 | McCulloch | 156—172 |
| 2,749,266 | 6/1956 | Eldred | 156—173 |
| 2,974,713 | 3/1961 | Hydrick | 156—172 |
| 3,038,831 | 6/1962 | Rosenberg | 156—173 |
| 3,068,133 | 12/1962 | Clicker et al. | 156—171 |
| 3,105,786 | 10/1963 | Anderson | 156—173 |
| 3,216,876 | 11/1965 | Tyhurst | 156—173 |
| 3,243,949 | 4/1966 | Clicker et al. | 156—172 |
| 3,372,075 | 3/1968 | Holt et al. | 156—172 |

BENJAMIN R. PADGETT, Primary Examiner

F. M. GITTES, Assistant Examiner

U.S. Cl. X.R.

156—172, 173